UNITED STATES PATENT OFFICE.

AUGUSTUS DAMON LEDOUX, OF NEW YORK, N. Y., ASSIGNOR TO DAVID PRINCE, OF ELIZABETH, N. J.

PROCESS OF MAKING RED OXIDE OF IRON FROM PYRITES.

SPECIFICATION forming part of Letters Patent No. 360,967, dated April 12, 1887.

Application filed June 21, 1886. Serial No. 205,755. (Specimens.)

*To all whom it may concern:*

Be it known that I, AUGUSTUS DAMON LEDOUX, a citizen of the United States, and a resident of the city of New York, in the county of New York and State of New York, have invented a certain new and useful Improvement in Processes of Manufacturing Red Oxide of Iron; and I do hereby declare that the following is a full, clear, and exact description of the invention, which will enable others skilled in the art to which it appertains to make and use the same.

Heretofore red-oxide-of-iron paints have been manufactured from crystallized sulphate of iron, or "copperas," so called, by roasting the crystals in a suitable furnace until the water of crystallization is driven off and the resulting oxide of iron yields the desired color when exposed to the usual tests; but hitherto no one has succeeded in producing a red-oxide-of-iron paint by the direct treatment of native iron ores or of the natural or artificial oxides of iron.

The object of my invention is to facilitate and cheapen the manufacture of red-oxide-of-iron paints by the utilization of native iron ores or natural or artificial oxides of iron, but especially by the utilization for that purpose of the oxide which results from roasting iron pyrites in the manufacture of sulphuric acid, which is now a mere waste product and a drag in the hands of the manufacturer. This I accomplish by the direct treatment of the native ores of iron, such as hematite or magnetite, or of other oxides of iron, but particularly by the treatment of the roasted pyrites of the sulphuric-acid works, as follows:

Sulphuric acid, preferably of about fifty (50°) degrees Baumé, is heated in a suitable vessel to a temperature of from about 230° Fahrenheit to 270° Fahrenheit. About two-thirds, by weight, of the roasted pyrites (or of the crushed iron ore or other oxides of iron which may be employed) is then added, a little at a time, with constant stirring. The chemical action is more or less violent, and the limit of the proper addition of the roasted pyrites is reached when the mass becomes pasty and then quickly solidifies, drying out at the same time. The mass now consists, principally, of crude amorphous sulphate of iron, together with a silicious gangue, and, probably, some undecomposed oxide. The mass is then roasted in a suitable roasting-furnace at a cherry-red heat, with frequent stirring. The roasting and stirring process should be continuous, (care being taken not to allow the temperature to rise above a cherry-red heat,) until the conversion of the sulphate into oxide is complete and the sulphur has been all driven off in fumes. The resulting oxide is then tested from time to time until it exhibits the desired color on cooling, care being taken to keep the mass in the furnace at the same even temperature until the tests yield a satisfactory result. When this is obtained, the oxide is removed from the furnace and allowed to cool, and is then ground to an impalpable powder. By this method of treating roasted pyrites or ores and oxides of iron a bright-red-oxide-of-iron paint is obtained, in every way equal to that which results from the treatment of the crystallized sulphate of iron or copperas by the usual methods; and a striking advantage of my process is that by the utilization of the roasted iron pyrites, which has always been a waste product in the manufacture of sulphuric acid, the cost of producing the paint is materially lessened, and the intermediate process of crystallization of sulphate of iron is entirely eliminated.

The advantage of my process is still further emphasized by the fact that while it requires about five tons of the crystals of sulphate of iron or copperas to make one ton of the paint, only one ton of the roasted pyrites cinder is required to produce, when treated by my process, a full ton of the paint.

Having fully described my invention, what I desire to claim, and secure by Letters Patent, is—

The process of producing paint from iron pyrites or native iron ores, which consists in roasting the iron pyrites or ore, adding the roasted mass to hot sulphuric acid, then calcining, and grinding the product, as set forth.

AUGUSTUS DAMON LEDOUX.

Witnesses:
A. M. SMOOT,
P. A. NOLAN.